(12) United States Patent
Bredemeier et al.

(10) Patent No.: US 9,870,691 B2
(45) Date of Patent: Jan. 16, 2018

(54) APPARATUS FOR OPERATING A DOOR OF AN AIRCRAFT, AN AIRCRAFT HAVING SUCH AN APPARATUS AND METHOD FOR OPERATING A DOOR OF AN AIRCRAFT

(71) Applicant: Airbus Operations GmbH, Hamburg (DE)

(72) Inventors: Kai Bredemeier, Hamburg (DE); Fred Raszpir, Hamburg (DE); Sven Teichmann, Hamburg (DE)

(73) Assignee: Airbus Operations GmbH (DE)

( * ) Notice: Subject to any disclaimer, the term of this patent is extended or adjusted under 35 U.S.C. 154(b) by 208 days.

(21) Appl. No.: 14/799,685

(22) Filed: Jul. 15, 2015

(65) Prior Publication Data

US 2016/0019770 A1 Jan. 21, 2016

(30) Foreign Application Priority Data

Jul. 18, 2014 (EP) ..................................... 14177605

(51) Int. Cl.
*G08B 21/18* (2006.01)
*B64C 1/14* (2006.01)
(Continued)

(52) U.S. Cl.
CPC ............ *G08B 21/18* (2013.01); *B64C 1/1423* (2013.01); *B64D 25/08* (2013.01); *B64D 25/14* (2013.01); *E05B 17/226* (2013.01); *E05C 3/165* (2013.01)

(58) Field of Classification Search
CPC ........ E05C 3/165; B64C 1/1423; B64D 25/14
(Continued)

(56) References Cited

U.S. PATENT DOCUMENTS 4,375,877 A   3/1983   Shorey
4,473,201 A * 9/1984   Barnes .................. B64C 1/1415
                                                244/129.5
(Continued)

FOREIGN PATENT DOCUMENTS

DE   102005014581 A1   9/2006
DE   102005017451 A1   10/2006
(Continued)

OTHER PUBLICATIONS

Chapter 7 of DC-1 0 Flight Crew Operating Manual, Published and updated Feb. 1, 1975 to Aug. 1, 1984.
(Continued)

*Primary Examiner* — Brian M O'Hara
*Assistant Examiner* — Keith L Dixon
(74) *Attorney, Agent, or Firm* — Lerner, David, Littenberg, Krumholz & Mentlik, LLP

(57) ABSTRACT

A system for operating an aircraft door includes an operating handle having a lever and a grip, a slide arming means movable between a first position representing an armed state and a second position representing a disarmed state, a control unit coupled with the slide arming means, warning means arranged in the vicinity of the slide arming means and a sensor. The sensor is adapted for detecting the proximity of a hand of a user in a field around the grip, which field covers a distance of at least 10 cm and not exceeding 50 cm to the grip, and for producing a proximity signal representing the proximity of a hand of a person. The control unit is adapted for operating the warning means on receiving the proximity signal of the sensor to attention to the slide arming means when the slide arming means is in the first position.

11 Claims, 5 Drawing Sheets

(51) Int. Cl.
   *B64D 25/14*   (2006.01)
   *B64D 25/08*   (2006.01)
   *E05B 17/22*   (2006.01)
   *E05C 3/16*    (2006.01)

(58) Field of Classification Search
   USPC .................................................. 244/129.5
   See application file for complete search history.

(56) References Cited

U.S. PATENT DOCUMENTS

| | | | |
|---|---|---|---|
| 4,497,462 A | 2/1985 | Hamatani | |
| 4,553,474 A | 11/1985 | Wong et al. | |
| 4,929,936 A | 5/1990 | Friedman et al. | |
| 5,106,036 A | 4/1992 | Sepstrup | |
| 5,480,109 A * | 1/1996 | Klein | B64C 1/1407 244/129.5 |
| 5,984,234 A * | 11/1999 | Brouwer | B64C 1/1407 244/129.5 |
| 6,334,276 B1 * | 1/2002 | Marin-Martinod | B64C 1/1407 49/139 |
| 6,467,729 B2 * | 10/2002 | Buchs | B64C 1/1407 244/129.5 |
| 6,633,239 B2 * | 10/2003 | Plude | B64C 1/14 244/129.3 |
| 9,199,716 B2 * | 12/2015 | Knijnenburg | B64C 1/1407 |
| 9,469,413 B2 * | 10/2016 | Waigl | B64D 45/00 |
| 9,720,011 B2 * | 8/2017 | Riedel | G01P 13/00 |
| 2003/0132345 A1 | 7/2003 | Lehmann | |
| 2003/0210139 A1 | 11/2003 | Brooks et al. | |
| 2006/0287829 A1 | 12/2006 | Pashko-Paschenko | |
| 2007/0171053 A1 | 7/2007 | Heppeler | |
| 2008/0007400 A1 | 1/2008 | Murphy | |
| 2008/0048889 A1 | 2/2008 | Naegler et al. | |
| 2008/0284619 A1 | 11/2008 | Farmer et al. | |

FOREIGN PATENT DOCUMENTS

| | | |
|---|---|---|
| EP | 0009379 A1 | 4/1980 |
| EP | 0743246 A1 | 11/1996 |
| EP | 1410987 A2 | 4/2004 |
| EP | 2108585 A1 | 10/2009 |
| EP | 1 719 084 B1 | 1/2011 |
| GB | 675778 A | 7/1952 |
| GB | 2322108 A | 8/1998 |
| GB | 2376552 A | 12/2002 |
| JP | 6010557 | 1/1994 |
| JP | 2003099863 A | 4/2003 |
| WO | 2005083647 A1 | 9/2005 |
| WO | 2006037543 A1 | 4/2006 |
| WO | 2006114640 A1 | 11/2006 |
| WO | 2007001370 A2 | 1/2007 |
| WO | 2007041091 A1 | 4/2007 |
| WO | 2009/124859 A1 | 10/2009 |

OTHER PUBLICATIONS

Description of the landing gear of Bombardier Challenger 605 aircraft, pp. 1-21, 2006.
Description of air conditioning and pressurization of Bombardier Challenger 605 aircraft, pp. 1-25, 2006.
Multi-Purpose Flight Recorder Installation and Operating Manual PIM422-I,Penny+Giles A Curtiss-Wright Company, Aug. 2004.
U.S. Appl. No. 12/936,743, filed Dec. 14, 2010.

* cited by examiner

APPARATUS FOR OPERATING A DOOR OF AN AIRCRAFT, AN AIRCRAFT HAVING SUCH AN APPARATUS AND METHOD FOR OPERATING A DOOR OF AN AIRCRAFT

TECHNICAL FIELD

The invention relates to an apparatus for operating a door of an aircraft, an aircraft having such an apparatus as well as a method for operating a door of an aircraft.

BACKGROUND OF THE INVENTION

In particular in aircraft of the manufacturer AIRBUS, doors are provided that include a door operation handle, which must be pulled upwards in order to lift and open the door. The movement must be conducted in an opposite direction for lowering and closing the door. Each passenger door includes a separate handle for arming or disarming a dedicated emergency escape slide.

Emergency escape slides of each door have to be armed before flight. This means that the operation of the door is directly coupled with the actuation of the escape slide arranged at the respective door. Arming and disarming is generally conducted by the cabin crew after all doors are fully closed, which is conducted after all passengers have boarded the aircraft. Disarming the slides is conducted after the aircraft has reached its final parking position after flight. Only after disarming the escape slides, the doors should be opened in order to prevent an inadvertent slide deployment.

A common slide arming mechanism coupled with the slide arming lever is rather complex as a kinematical chain of several levers and rods is used, which extends from the slide arming lever to a girt bar coupled with the escape slide. Consequently, the required force for moving the slide arming lever is rather high.

WO 2009124859 A1 discloses a system for preventing inadvertent escape slide deployment, comprising a sensor for sensing the proximity of a person in front of an aircraft door, and an optical warning means operable to provide an optical indication in the vicinity of a slide arming lever when the sensor detects the proximity of a person in front of the aircraft door.

EP 1 719 084 B1 discloses an alarm system for an aircraft door comprising a sensor for sensing when the door operating handle is about to be gripped by an operator through sensing a hand pressure of an operator gripping the handle or through sensing light, heat, humidity or chemical parameters responding to contact with a characteristic of an operators hand, an aural alarm associated with the sensor and operable to sound when the sensor detects that the handle is about to be gripped, and means for automatically arming the sensor and/or aural alarm when the emergency evacuation slide of the aircraft door is armed so as to be released if the air craft door is opened.

BRIEF SUMMARY OF THE INVENTION

Due to the distinct mechanical forces required for disarming a slide and due to the possibility of a mechanical jam, even with slide warning means inadvertent slide deployments may occur. Consequently, an aspect of the invention may provide an apparatus for operating a door of an aircraft, which is capable of preventing some or all potential causes for inadvertent slide deployment and for improving the ease of operating the aircraft door for cabin crew.

A system for operating an aircraft door is proposed, comprising an operating handle having a lever and a grip, a slide arming means, which is movable between a first position representing an armed state and a second position representing a disarmed state, a control unit coupled with the slide arming means, warning means arranged in the vicinity of the slide arming means and a sensor for detecting the distance to or the proximity of an object. The slide arming means is adapted for producing a first control signal representing a movement of the slide arming means between the first and second position. The sensor is arranged at a distance to the grip, which distance does not exceed 60 cm when the operating handle is closed. The sensor is adapted for detecting the proximity of a hand of a user in a field around the grip, which field covers a distance of at least 10 cm and not exceeding 50 cm to the grip and for producing a proximity signal representing the proximity of a hand of a person. The control unit is adapted for operating the warning means on receiving the proximity signal of the sensor in order to raise attention to the slide arming means when the slide arming means is in the first position.

A core of the invention therefore lies in a clearly improved detection of a hand of an operator attempting to grip an operating handle for opening the aircraft door with the slide arming means being in an armed state. This allows to provide a warning in a sufficient time before actually the attempt results in moving the operating handle.

By placing the sensor, which may especially be an ultrasonic sensor for detecting a distance, into a distance of the grip, which distance does not exceed 60 cm, a near-field observation of objects reaching to the handle is accomplished. By limiting the field, which may be done by appropriately tuning the sensor, false alarms are clearly prevented. The sensor may also be an infrared sensor, a laser based distance sensor or another appropriate sensor.

In an advantageous embodiment the system comprises a girt bar coupled with an evacuation slide located at the aircraft door and an actuator coupled with the girt bar. The control unit is adapted for operating the actuator on receiving the first control signal.

Advantageously, the system comprises a girt bar coupled with an evacuation slide located at the aircraft door and an actuator coupled with the girt bar and the control unit. The control unit is adapted for operating the actuator on receiving the first control signal. Using an actuator coupled with a girt bar leads to a clearly improved operation of the door, as a direct mechanical connection between a slide arming lever and a girt bar is eliminated. A girt bar is a device for initiating the deployment of an emergency slide and allows coupling with or decoupling the slide from the aircraft door. A slide arming means may now be reduced to a simple switch, a lever, a handle, a push-button or any other suitable means that may be operated by the crew, is much easier to be operated and mechanical failures in the kinematical chain between a slide arming lever and the girt bar may be avoided. Further, the state of the slide arming means may simply be detected, such that for example, electrical or hydraulic power for the actuator may be blocked or interrupted through the control unit if desired. Further, such a control unit may also process information about the attempt to open the door from the outside, which will automatically disarm the girt bar such that a safe opening from outside the aircraft is possible. A further advantage lies in that all operating means may optically stay the same, i.e. have the same appearance for crew personnel. Hence, training for the system according to an embodiment of the invention is not required. Further, ergonomically advantageous designs may be simply maintained. The door operation handle interface remains unchanged and the slide arming means may still be a mechanically movable handle that visually indicates the slide state by its two possible end positions. Existing placards may remain unchanged, however they may be relocated. If the system according to an embodiment of the invention is realized as a retrofit for existing aircraft, none of any existing slide warning means would have to be changed. However, additional warning means may be added, which may further improve the safe aircraft door operation. The actuator may especially be of a rather simple, electrical type with a great mean time between failure and forces for slide arming or disarming does no longer have to be applied by human. Still further, the actuator coupled with the girt bar may be part of the escape slide which is subject to regularly placements during aircraft checks. However, this may be relevant for door mounted slides only. The additional weight for the actuator is more than compensated by the lack of the kinematical chain between a slide arming means and the girt bar.

In an advantageous embodiment, the sensor is arranged on the aircraft door facing to the operating handle. The sensor therefore conducts an observation of a field, which extends in a lateral direction of the sensor. Hence, a person standing in a proximity of an aircraft door will not cause a false alarm.

In a still further advantageous embodiment, the sensor is arranged in at least one of a slide armed indication light attached to the aircraft door and a window funnel of an observation window in the aircraft door. By this, a rather simple retrofit option is achieved. The slide armed indication light and the window funnel or objects arranged the may easily be replaced, which is much simpler than attaching the sensor into different positions or different elements of the aircraft door.

In an advantageous embodiment, the sensor is arranged on the lever of the operating handle. This allows to easily retrofit an optimized, multi-functional door operating handle to existing aircraft doors without requiring further modifications for lining or cladding elements of the door itself. Further, this sensor is arranged at a position, which is advantageous for detecting the presence or the motion of a person who may attempt to open the door.

In a preferred embodiment, the sensor is at least one of integrated into and attached to an outer surface of the lever and wherein the sensor comprises a detection direction facing away from the aircraft door to be operated. By this measure, a detection area is created which extends from the operating handle into the inside of the fuselage of the respective aircraft. By adjusting the sensor, the detection area may be limited to exemplarily 1 m in order to prevent false alarms.

In an advantageous embodiment, the warning means comprises at least one of an optical warning means for providing a clearly visible optical indication and an acoustic warning means for providing a clearly noticeable acoustic warning sound. The optical warning means may comprise any sort of blinking or flashing lights, projected symbols and any other means that comprises a distinct optical flow that may easily be detected through the corner of an eye. Providing an optical warning leads to efficiently make a user aware of a danger of inadvertently deploying an escape slide even during noise in the cabin. An acoustic warning means may include a device for playing a certain pre-recorded sound or is adapted for generating a certain warning sound.

In a still further advantageous embodiment, the warning means additionally comprises at least one warning light arranged in or on the grip. By providing a warning light or a warning symbol in the grip, an operator receives a clear warning that something adverse will happen when the grip is gripped and the operating handle is moved. This is only possible through the detection field presented by the sensor as the hand does not obstruct the warning light on the grip. In particular, the warning means in or on the grip may be adapted for providing a flashing light when it is activated and it may be adapted for producing no light at all when it is deactivated.

Advantageously, the grip comprises a longitudinal shape and is movably supported on the lever. The slide arming means comprises a rotational sensor for detecting a position of the grip relative to the lever. The grip may thereby be a device that enables a user to operate the operating handle or to alter the state of the evacuation slide from armed into disarmed or vice versa. Exemplarily, the grip may be arranged at an angle to the lever, wherein a rotational sensor for detecting a rotation of the grip relative to the lever is coupled with the control unit. The door operating handle then comprises even one more function, which is controllable through the grip, which is arranged at an angle to the lever. By simply changing the alignment of the grip, a control signal may be produced through the sensor arranged between the grip and the handle. For example, the grip may completely replace a conventional slide arming lever.

Furthermore, it is preferred that the grip is lockable in a first relative position and a second relative position. Through the locking, the position of the grip may determine the state of the evacuation slide.

The system may further comprise a spring loaded locking mechanism arranged between the lever and the grip, wherein the locking mechanism is adapted for locking the position of the grip and for releasing the grip through a release means, which may exemplarily be a push-button. Hence, the crew member may rotate the grip around the lever only if a release button has been pressed. Upon rotating the grip, the first control signal may be produced.

To further improve the prevention of inadvertent slide deployment, the grip may comprise different colours, wherein a warning colour may be visible only through moving the grip into an armed position and wherein a more neutral colour is only visible when the grip is moved into a disarmed position. For example, the colour visible in an armed position may be a bright orange or red, while the color visible in an unarmed position may be green.

The invention further relates to an aircraft comprising a fuselage, at least one access opening position in the fuselage, at least one aircraft door for closing the at least one opening and a system for operating the at least one aircraft door.

Furthermore, the invention also relates to a method for operating an aircraft door, comprising the steps of detecting a position of a slide arming means, which is movable between a first position representing an armed state and a second position representing a disarmed state of an evacuation slide, through receiving a first control signal by a control unit, the first control signal being produced by the slide arming means and representing a movement of the slide arming means between the first position and the second position, detecting the proximity of a hand of a person in a field around the grip, which field covers a distance of at least 10 cm and not exceeding 50 cm to the grip by means of a sensor for detecting the distance to or the proximity of an object, which produces a proximity signal, and operating warning means on receiving the proximity signal of the sensor in order to raise attention to the slide arming means when the slide arming means is in the first position.

At an advantageous embodiment, the method further comprises operating at least one warning means arranged in the vicinity of the slide arming means for raising the attention of a user to the slide arming means when it is in a first position and when the operating handle is about to be opened.

Still further, the method may comprise the steps of detecting the presence or the motion of a person in front of the aircraft door by means of a sensor arranged at a lever of the operating handle, which lever is coupled with a door operating mechanism and which comprises an operating and adapted to be moved by a user, generating a second control signal when the presence or the motion of a person is detected and transferring the second control signal to an apparatus for preventing an inadvertent slide deployment.

Still further, the first control signal may be generated by means of a rotational sensor for detecting a rotation of a substantially longitudinal grip arranged at an operating end of the operating lever around a rotational axis being substantially perpendicular to a main extension axis of the grip.

BRIEF DESCRIPTION OF THE DRAWINGS

Further characteristics, advantages and application options of the present invention are disclosed in the following description of the exemplary embodiments in the figures. All the described and/or illustrated characteristics per se and in any combination form the subject of the invention, even irrespective of their composition in the individual claims or their interrelationships. Furthermore, identical or similar components in the figures have the same reference characters.

DETAILED DESCRIPTION

Figure 1:
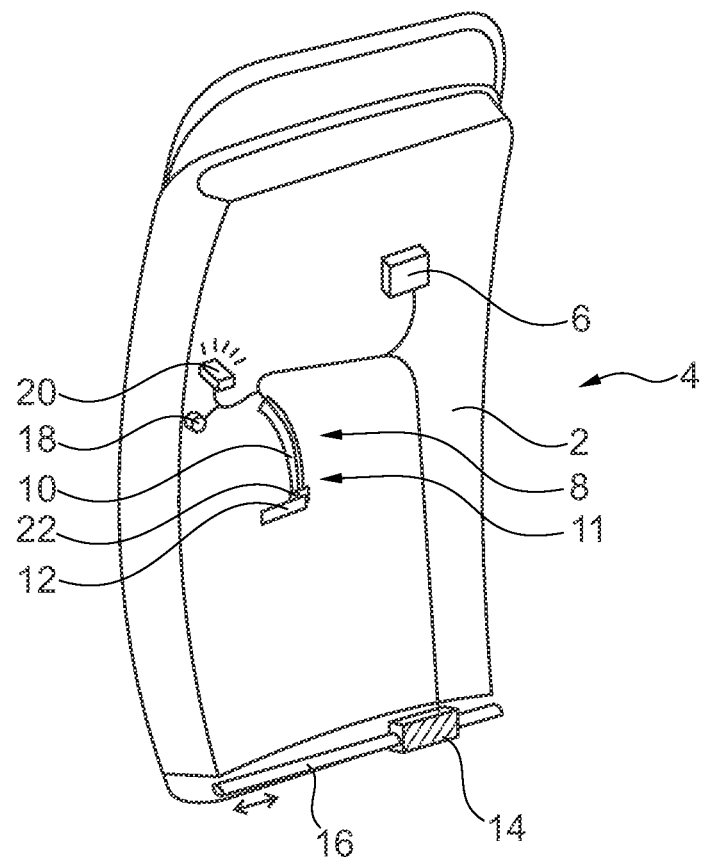
FIG. 1 shows an overview of the system for operating an aircraft door.

FIG. 1 shows an aircraft door 2 equipped with a system 4 for operating the door. The system 4 comprises a control unit 6, a handle 8 having a lever 10 and a grip 12, an actuator 14 coupled with a girt bar 16 as well as slide warning means 18 and 20. The control unit 6 is coupled with a rotational sensor 22 arranged between the lever 10 and the grip 12, which rotational sensor 22 is capable for detecting a rotational position between the grip 12 and the lever 10. Further, the control unit 6 is capable of detecting the position of the handle 8, which includes an open and a closed position.

The grip 12 may be rotated around an axis substantially parallel to an end of lever 10 close to the grip 12, by which rotation a first control signal may be initiated through rotational sensor 22, for example for arming or disarming a slide.

The actuator 14 is coupled with the girt bar 16 for deploying a slide, which is not shown in this figure.

Depending on a slide arming state, the slide warning means 18 and 20 may warn a user from inadvertently opening the aircraft door 2 when the slide is armed.

Figure 2:
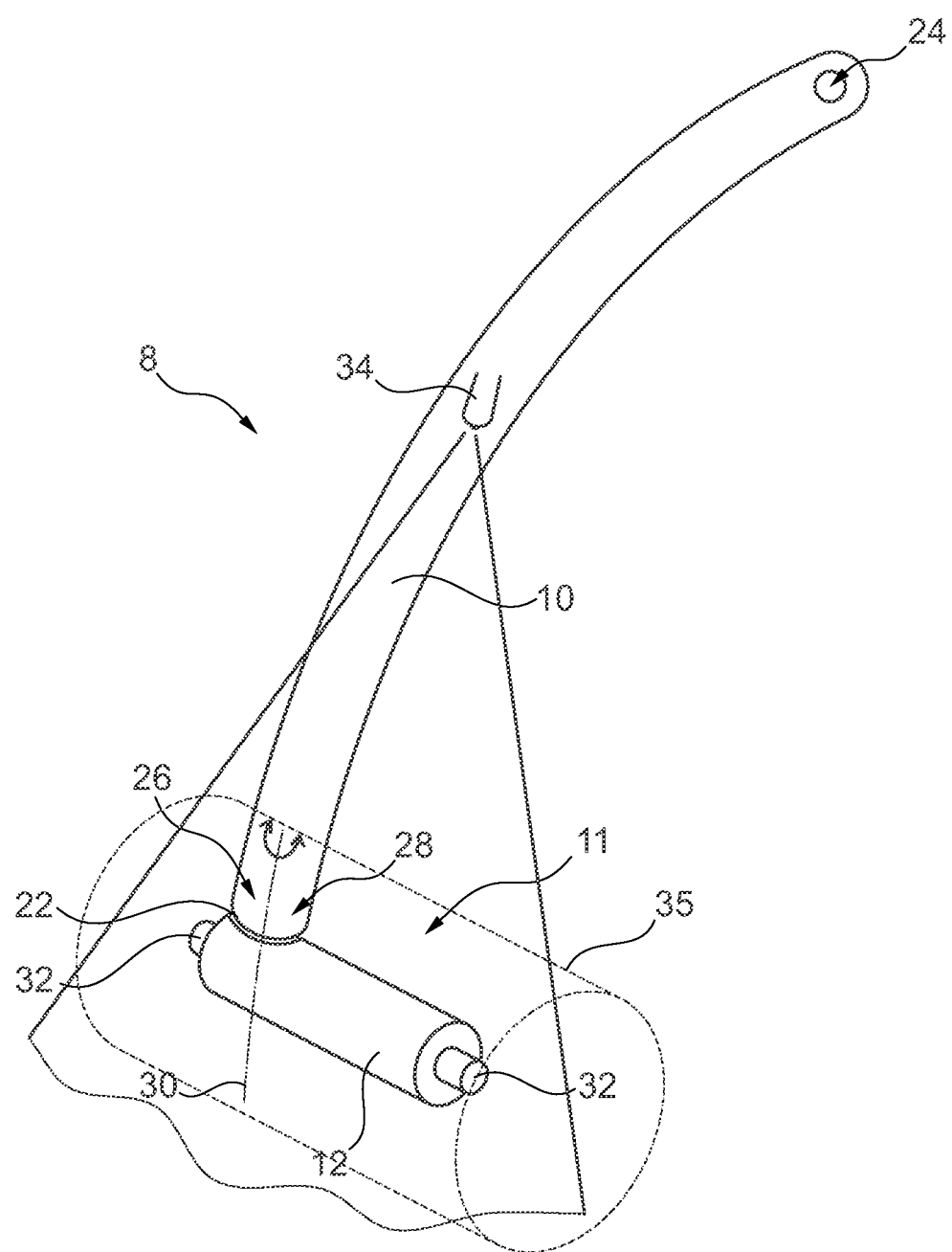
FIGS. 2 to 4b show the operating handle in different positions and views.

In FIG. 2, the door operating handle 8 is shown in more detail. The lever 10 comprises a first end 24, which is coupled with a door operating mechanism, which is not shown in detail in FIG. 2. A second end 26 comprises a hinge 28, to which the grip 12 is coupled. The hinge 28 is adapted for rotating the grip 12 around an axis 30, which may be parallel to a tangent line of the centre of the second end 26 of lever 10. Hence, grip 12 may be rotated around the second end 26.

The rotational sensor 22, which is indicated by a ring-shaped shape, is capable to detect the actual position of the grip 12 relative to the lever 10. For preventing an inadvertent rotation of the grip 12, it comprises two laterally arranged buttons 32, wherein one of the buttons 32 has to be pressed in order to be able to rotate the grip 12. For clarification, FIG. 3 discussed below shows a simplified arrangement for locking or unlocking the grip 12 relative to the lever 10. Lever 10 further comprises a sensor 34, which may be an ultrasonic sensor, for detecting the proximity or motion of a hand in a field around the grip 12, which is indicated by a dashed line 35. This field 35 may be created through using a sensor 34 exemplarily having funnel shaped detection space, which may be adjusted through appropriately tuning the sensor 34. In addition, the control unit 6 may be able to receive distance information from the sensor 34, which may be used to decline or ignore all distance information outside the particular field 35. Hence, control unit 6 and sensor 34 in combination are capable of defining the detection field 35.

When detecting the presence or the motion of a person the field 35, the control unit 6 initiates the warning by means of the slide warning means 18 and 20. By this, a person is warned to open the aircraft door 2 when the slide is in an armed state.

Figure 3:
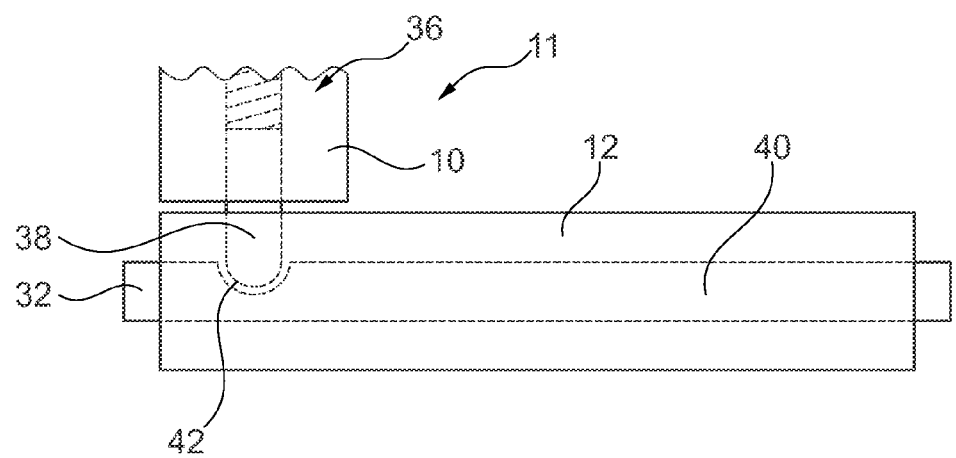

FIG. 3 shows a spring loaded locking mechanism 36 inside the lever 10. Here, a locking pin 38 protrudes into the grip 12, in which grip a slider 40 is arranged, which comprises a recess 42 for receiving the locking pin 38. By pressing one of the buttons 32 into the direction of the grip 12, the locking pin 38 is urged out of the recess 42 into the lever 10. Hereby, a locking mechanism, which may be coupled to the hinge 28, may be released.

Figure 4A:
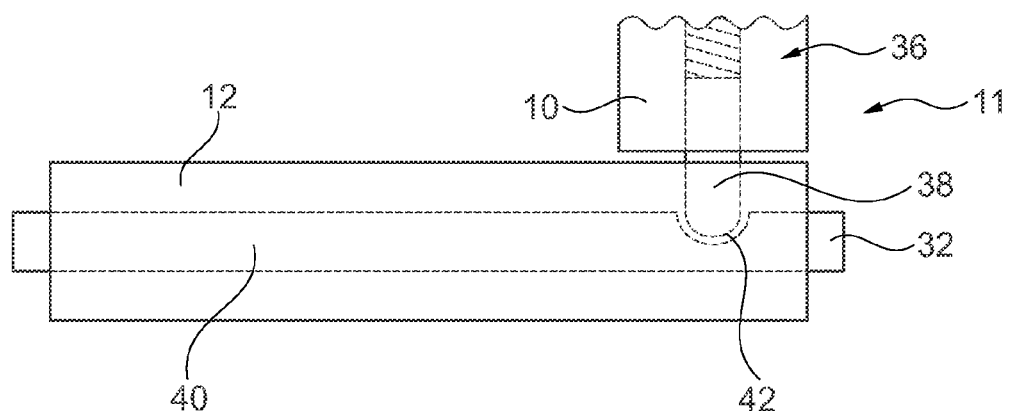
Figure 4B:
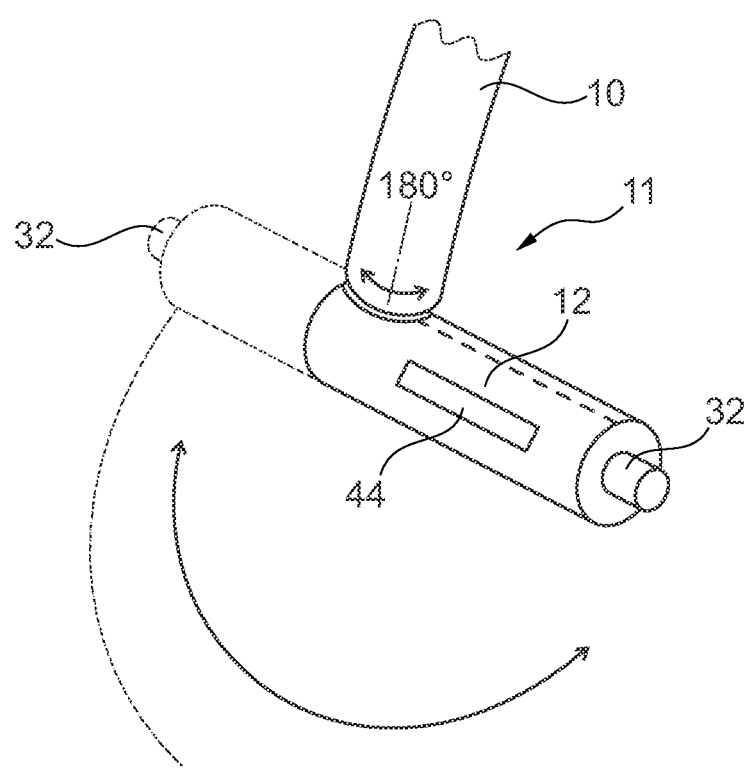

As shown in FIGS. 4a and 4b, the grip 12 may show into the flight direction when the slide is armed. Further, the grip 12 may direct to the opposite direction, when the slide is disarmed.

Advantageously, as shown in FIG. 4b, the grip 12 may comprise a warning color on a side visible from the cabin, when extending in flight direction. On the same side, an additional optical warning means 44 may be arranged on the grip 12, which may also be coupled to the control unit 6 and adapted for emitting a warning light when a hand is detected in the field 35 when the slide arming means is in the first position representing an armed mode.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for operating an aircraft door, the system comprising:
   an operating handle having a lever and a grip;
   an operating handle having a lever and a grip;
   a slide arming means movable between a first position representing an armed state and a second position representing a disarmed state;
   a control unit coupled with the slide arming means;
   warning means arranged in the vicinity of the slide arming means; and a sensor for detecting the distance to or the proximity of an object,
   wherein the slide arming means is adapted for producing a first control signal representing a movement of the slide arming means between the first and second position,
   wherein the sensor is arranged at a distance to the grip, which distance does not exceed 60 cm when the operating handle is closed,
   wherein the sensor is adapted for detecting the proximity of a hand of a user in a field around the grip, which field covers a distance of at least 10 cm and not exceeding 50 cm to the grip and for producing a proximity signal representing the proximity of the hand of a user, and
   wherein the control unit is adapted for operating the warning means on receiving the proximity signal of the sensor to raise attention to the slide arming means when the slide arming means is in the first position.

2. The system of claim 1, further comprising:
   a girt bar coupled with an evacuation slide located at the aircraft door; and
   an actuator coupled with the girt bar,
   wherein the control unit is adapted for operating the actuator on receiving the first control signal.

3. The system of claim 1, wherein the sensor is arranged on the aircraft door facing to the operating handle.

4. The system of claim 1, wherein the sensor is arranged in at least one of a slide armed indication light attached to the aircraft door and a window funnel of an observation window in the aircraft door.

5. The system of claim 1, wherein the sensor is arranged on the lever of the operating handle.

6. The system of claim 1, wherein the warning means comprises at least one of an optical warning means for providing a visible optical indication and an acoustic warning means for providing a noticeable acoustic warning sound.

7. The system of claim 1, wherein the warning means additionally comprises at least one warning light arranged in or on the grip.

8. The system of claim 1,
   wherein the grip comprises a longitudinal shape adapted for being gripped by a hand of a user,
   wherein the grip is movably supported on the lever, and
   wherein the slide arming means comprises a rotational sensor for detecting a position of the grip relative to the lever.

9. The system of claim 8, wherein the grip is lockable in a first relative position and a second relative position.

10. The system of claim 8,
    further comprising a spring loaded locking mechanism arranged between the lever and the grip,
    wherein the locking mechanism is adapted for locking the position of the grip and for releasing the grip through a release means.

11. An aircraft comprising:
    a fuselage;
    at least one access opening positioned in the fuselage;
    at least one aircraft door for closing the at least one opening; and
    a system for operating the at least one aircraft door, the system comprising:
       an operating handle having a lever and a grip;
       a slide arming means movable between a first position representing an armed state and a second position representing a disarmed state;
       a control unit coupled with the slide arming means;
       warning means arranged in the vicinity of the slide arming means; and a sensor for detecting the distance to or the proximity of an object,
          wherein the slide arming means is adapted for producing a first control signal representing a movement of the slide arming means between the first and second position,
          wherein the sensor is arranged at a distance to the grip, which distance does not exceed 60 cm when the operating handle is closed,
          wherein the sensor is adapted for detecting the proximity of a hand of a user in a field around the grip, which field covers a distance of at least 10 cm and not exceeding 50 cm to the grip and for producing a proximity signal representing the proximity of the hand of a user, and
       wherein the control unit is adapted for operating the warning means on receiving the proximity signal of the sensor to raise attention to the slide arming means when the slide arming means is in the first position.

* * * * *